United States Patent
Villalon, Jr. et al.

(10) Patent No.: US 12,357,945 B2
(45) Date of Patent: Jul. 15, 2025

(54) SYSTEMS AND METHODS FOR RECOVERY OF SUBSTANCES FROM MOLTEN SALT ELECTROLYSIS

(71) Applicant: Phoenix Tailings, Inc., Woburn, MA (US)

(72) Inventors: Thomas Anthony Villalon, Jr., Boston, MA (US); Richard Robert Salvucci, Quincy, MA (US); Henry Chase Hutcheson, Malden, MA (US)

(73) Assignee: Phoenix Tailings, Inc., Woburn, MA (US)

( * ) Notice: Subject to any disclaimer, the term of this patent is extended or adjusted under 35 U.S.C. 154(b) by 0 days.

(21) Appl. No.: 18/463,495

(22) Filed: Sep. 8, 2023

(65) Prior Publication Data
US 2024/0082783 A1 Mar. 14, 2024

Related U.S. Application Data

(60) Provisional application No. 63/405,010, filed on Sep. 9, 2022.

(51) Int. Cl.
*C25C 3/00* (2006.01)
*B01D 39/12* (2006.01)
(Continued)

(52) U.S. Cl.
CPC ............. *B01D 53/78* (2013.01); *B01D 39/12* (2013.01); *B01D 53/002* (2013.01);
(Continued)

(58) Field of Classification Search
CPC ...... B01D 53/78; B01D 39/12; B01D 53/002; B01D 53/1418; B01D 53/18; B01D 53/68;
(Continued)

(56) References Cited

U.S. PATENT DOCUMENTS

| | | | |
|---|---|---|---|
| 4,041,142 A | | 8/1977 | Moore |
| 4,428,800 A | * | 1/1984 | Tarcy ................. G01N 27/4162 436/124 |

(Continued)

FOREIGN PATENT DOCUMENTS

| | | |
|---|---|---|
| CN | 203139858 U | 8/2013 |
| CN | 112206600 A | 1/2021 |

(Continued)

OTHER PUBLICATIONS

WO2022/159604; Processes for Producing Bicarbon Pellets with Adjustable Grindability Index; 2022 (Year: 2022).*

(Continued)

*Primary Examiner* — Zulmariam Mendez
(74) *Attorney, Agent, or Firm* — Wolf, Greenfield & Sacks, P.C.

(57) ABSTRACT

Systems and methods for recovery of gaseous substances from molten salt electrolysis are generally described. Certain systems comprise a cell configured for molten salt electrolysis; a collector fluidically connected to the cell and configured to collect volatilized molten salt from the cell; and a gas scrubber fluidically connected to the collector and configured to at least partially remove a gas from an effluent stream of the cell. Some methods comprise, using a pressure gradient: transporting a gas comprising molten salt vapor from an electrolytic cell to and through a collector such that at least a portion of the molten salt vapor forms a solid within the collector; and transporting some or all of the gas from the collector through a gas scrubber.

22 Claims, 14 Drawing Sheets

(51) Int. Cl.
- *B01D 53/00* (2006.01)
- *B01D 53/14* (2006.01)
- *B01D 53/18* (2006.01)
- *B01D 53/68* (2006.01)
- *B01D 53/75* (2006.01)
- *B01D 53/78* (2006.01)
- *C25C 3/34* (2006.01)

(52) U.S. Cl.
CPC ......... *B01D 53/1418* (2013.01); *B01D 53/18* (2013.01); *B01D 53/68* (2013.01); *B01D 53/75* (2013.01); *C25C 3/34* (2013.01); *B01D 2251/304* (2013.01); *B01D 2251/604* (2013.01); *B01D 2252/103* (2013.01); *B01D 2257/204* (2013.01); *B01D 2258/025* (2013.01)

(58) Field of Classification Search
CPC .............. B01D 53/75; B01D 2251/304; B01D 251/604; B01D 2252/103; B01D 2257/204; B01D 2258/025; C25C 3/34
See application file for complete search history.

(56) References Cited

U.S. PATENT DOCUMENTS

| | | | |
|---|---|---|---|
| 4,761,207 A * | 8/1988 | Stewart, Jr. | ......... C22B 21/0092 75/10.39 |
| 5,882,620 A | 3/1999 | Downey et al. | |
| 2013/0152734 A1 | 6/2013 | Pal et al. | |
| 2013/0175161 A1 | 7/2013 | Morelle et al. | |
| 2015/0209838 A1 * | 7/2015 | Diana | ................. C23C 16/4405 134/22.1 |
| 2022/0002890 A1 | 1/2022 | Lubomirsky et al. | |

FOREIGN PATENT DOCUMENTS

| | | |
|---|---|---|
| CN | 215463047 U | 1/2022 |
| CN | 216856165 U | 7/2022 |

OTHER PUBLICATIONS

[No Author Listed], Print-out from private search service, retrieved on Jul. 12, 2023. Listed as machine translation of Russian Patent Publication No. RU 93007396 A, with a listed publication date of Mar. 20, 1996. Original copy unavailable.

Escalona-Duran et al., Electroscrubbers for removing volatile organic compounds and odorous substances from polluted gaseous streams. Curr Opin Electrochem. Aug. 2021;28:100718.

Ripke et al., MIDREX H2: Ultimate Low CO2 Ironmaking and its place in the new Hydrogen Economy. Direct from Midrex. Sep. 2017: 13 pages.

Written Opinion of the International Preliminary Examining Authority for International Application No. PCT/US2023/032322 dated Aug. 28, 2024.

International Search Report and Written Opinion for International Application No. PCT/US2023/032322 dated May 15, 2024.

International Preliminary Report on Patentability (Chapter 2) for International Application No. PCT/US2023/032322 dated Dec. 12, 2024.

* cited by examiner

SYSTEMS AND METHODS FOR RECOVERY OF SUBSTANCES FROM MOLTEN SALT ELECTROLYSIS

RELATED APPLICATIONS

This application claims priority under 35 U.S.C. § 119(e) to U.S. Provisional Patent Application No. 63/405,010, filed Sep. 9, 2022, and entitled "SYSTEMS AND METHODS FOR RECOVERY OF SUBSTANCES FROM MOLTEN SALT ELECTROLYSIS," which is incorporated herein by reference in its entirety for all purposes.

TECHNICAL FIELD

Systems and methods for recovery of substances from molten salt electrolysis are generally described.

SUMMARY

The present disclosure is directed to systems and methods for the recovery of substances from molten salt electrolysis. Certain aspects are related to the recovery of volatilized molten salt and/or other gaseous substances from cells configured for molten salt electrolysis. The subject matter of the present disclosure involves, in some cases, interrelated products, alternative solutions to a particular problem, and/or a plurality of different uses of one or more systems and/or articles.

Certain aspects are related to systems.

In some embodiments, the system comprises a cell configured for molten salt electrolysis; a collector fluidically connected to the cell, the collector configured to collect volatilized molten salt from the cell; and a gas scrubber fluidically connected to the collector, the gas scrubber configured to at least partially remove a gas from an effluent stream of the cell.

Certain aspects are related to methods.

In some embodiments, the method comprises, using a pressure gradient: transporting a gas comprising molten salt vapor from an electrolytic cell to and through a collector such that at least a portion of the molten salt vapor forms a solid within the collector; and transporting some or all of the gas from the collector through a gas scrubber such that a first portion of the gas reacts with a scrubbing agent to form a solid within the gas scrubber and a second portion of the gas is transported out of the gas scrubber.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
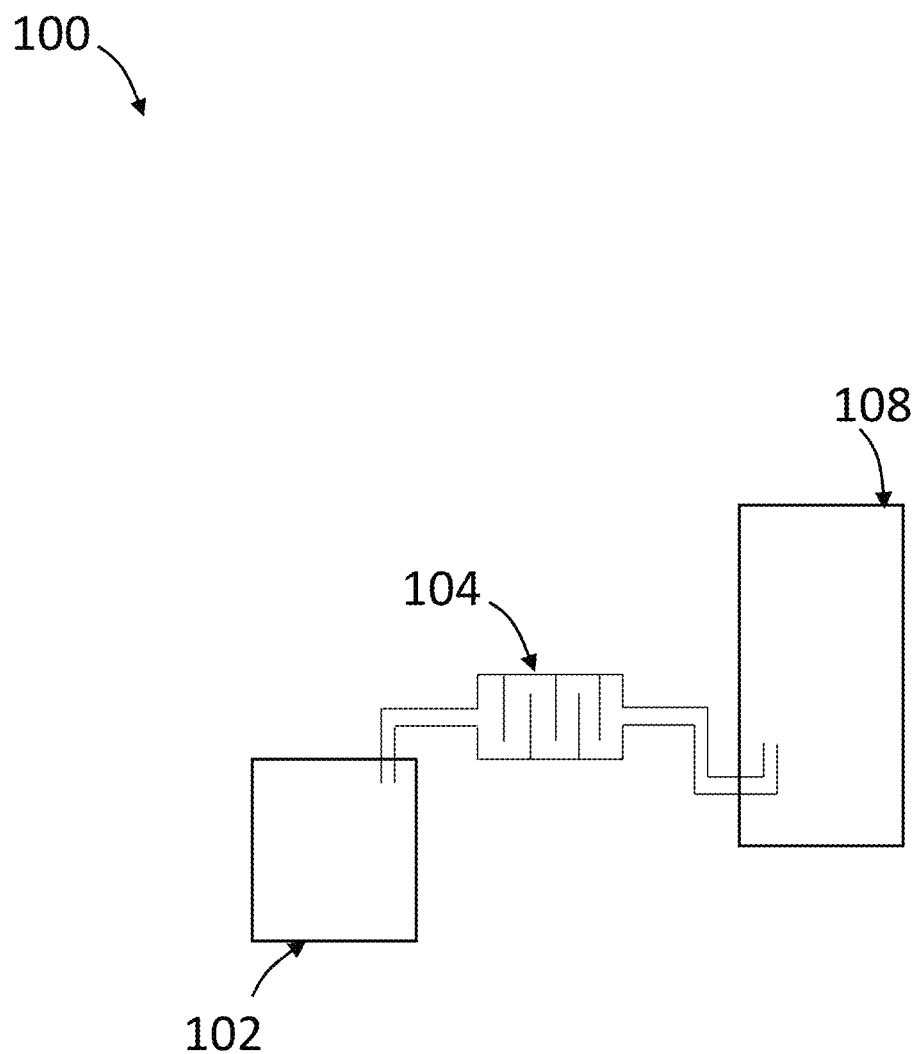
FIGS. 1A-1L are cross-sectional schematic illustrations of systems for conducting molten salt electrolysis and recovering substances therefrom, according to certain embodiments.

Systems described herein have been designed to collect (or scrub off) substances from electrolytic cells configured for high temperature electrolysis. The electrolysis may be run, for example, at a temperature of at least 300 degrees Celsius, at least 500 degrees Celsius, at least 650 degrees Celsius and/or less than or equal to 1400 degrees Celsius, less than or equal to 1200 degrees Celsius, and/or less than or equal to 1100 degrees Celsius, or any combination thereof (e.g., 300 to 1400 degrees Celsius, 500 to 1200 degrees Celsius, 650 to 1100 degrees Celsius, etc.)). In some embodiments, systems and methods described herein involve collecting and/or recycling multiple gaseous species from these electrolytic cells. Examples of gaseous substances that can be collected and/or recycled include but are not limited to gaseous halide(s) (e.g., chlorine, fluorine, etc.), carbon monoxide, carbon dioxide, $CF_x$, dioxins (e.g., furans), and molten salt vapors.

In general, the term "off-gassing" is used to refer to any process by which a component is released in gaseous form and includes volatilization of a liquid to a vapor, release of a trapped gas from a liquid or solid, or any other form of gas release. In general, as molten salt from the electrolyte off-gasses, it is advantageous to add salt back to the cell to replenish the lost electrolyte. Certain embodiments are related to systems and methods that can be used to sequester multiple off-gasses. In some such embodiments, molten salt vapors are also captured and, in some cases, recycled back into the electrolysis system. This may lead to enhancement in material and/or process efficiencies.

Certain of the systems and methods described herein, while collecting multiple different vapors in one piece of equipment, facilitate the recycling of molten salt vapors for use in the molten salt electrolyte of the electrolytic cell. In some such embodiments, salt does not have to be replenished with external materials during electrolysis, thus saving material.

Certain embodiments of this disclosure include integration of a molten salt collector with an effluent scrubber and an inert gas recycle. These components may contribute to a significant reduction in operating expense. By integrating these components together, one may facilitate more efficient operation of the molten salt electrolysis process and/or avoid the additional expense of replenishing molten salt and/or inert gas continuously.

Those of ordinary skill in the art would understand that a molten salt is a liquid-phase salt, as opposed to a solubilized salt (which refers to a salt that has been solubilized into its constituent ions within a solvent). In some embodiments, the molten salt is a salt that is in a solid phase when at a temperature of 25° C. and a pressure of 1 atmosphere but that melts to form a liquid phase when heated to or above its melting point.

As noted above, certain aspects are related to systems. The systems may be used to recover gaseous materials (e.g., volatilized molten salt, inert gases) from molten salt electrolysis. FIGS. 1A-1L are cross sectional schematic illustrations of examples of such systems (e.g., system 100).

In certain embodiments, the system comprises a cell configured for molten salt electrolysis. The molten salt electrolytic cell may have a plumbed outlet pipe (e.g., SS304, Inconel, Hastelloy C276 or other compatible materials with effluent gas). This outlet may lead to a collector.

In certain embodiments, the system comprises a collector fluidically connected to the cell, the collector configured to collect volatilized molten salt from the cell. In some embodiments, condensation and/or solidification occur in the collector. In some embodiments, the collector comprises one or more doors configured for recovering solid material from the collector. The collector may be a sealed unit which forces the effluent stream from the cell along a path in which the stream is allowed to cool sufficiently enough to precipitate out at least some of (e.g., all of) the molten salt vapors. In some embodiments, the effluent stream may then be directed to either a thermal oxidizer or caustic scrubber depending on the gas composition that is being scrubbed.

The collector may have any of a variety of shapes and/or sizes, according to some embodiments. In some cases, the collector maybe cylindrical, may be a rectangular prism, or other regular or irregular shapes that may facilitate the flow of gas therethrough. In some cases, an average maximum the cross-sectional dimension of the collector may be greater than or equal to 1 centimeter, greater than or equal to 2 centimeters, greater than or equal to 5 centimeters, greater than or equal to 10 centimeters, greater than or equal to 15 centimeters, or greater than or equal to 20 centimeters. In accordance with some embodiments, the average maximum cross-sectional dimension of the collector may be less than or equal to 25 centimeters, less than or equal to 20 centimeters, less than or equal to 15 centimeters, less than or equal to 10 centimeters, less than or equal to 5 centimeters, or less than or equal to 2 centimeters. Combinations of the foregoing ranges are possible (e.g., greater than or equal to 10 centimeters and less than or equal to 20 centimeters). Other ranges are also possible.

In some cases, the collector may contain a porous medium. In some embodiments, the porous medium may be a solid article through which pores are formed. In some embodiments, the porous medium may have a high surface area, on which the solid material may condense and/or solidify. For example, in some cases, the porous medium may comprise an electronically conductive material. In some embodiments, the porous medium may comprise a mesh. In some embodiments, the porous medium may comprise a filter, for example, a bag filter, a ceramic filter, and/or a mesh filter. In some embodiments, the porous medium may comprise a metal. According to some embodiments, the collector may comprise a porous medium comprising stainless steel. In some embodiments, the porous medium may comprise steel wool. In some embodiments, stainless steel wool as the porous medium may be particularly advantageous due to the ability to use them in relatively high temperatures.

In accordance with some embodiments, the porous medium may comprise relatively fine fibers. In some embodiments, the relatively fine fibers of the porous medium may result in the porous medium having a relatively high surface area on which species from the electrolytic cell may condense. In accordance with some embodiments, the fibers of the porous medium may have an average thickness of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 25 microns, less than or equal to 20 microns, or less than or equal to 10 microns. In some embodiments, the fibers of the porous medium may have an average thickness of greater than or equal to 1 micron, greater than or equal to 10 microns, greater than or equal to 20 microns, greater than or equal to 25 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. Combinations of the foregoing ranges are possible (e.g., greater than or equal to 20 microns and less than or equal to 30 microns). Other ranges are also possible.

According to some embodiments, the relatively fine fibers of the porous medium may result in the porous medium having a relatively small average pore size, which again results in the porous medium having a relatively high surface area on to which species from the electrolytic cell may condense and/or solidify. In accordance with some embodiments, the pore size of the porous medium may be measured by porosimetry (e.g., mercury intrusion porosimetry). In some embodiments, the average pore size of the porous medium is greater than or equal to 0.5 microns, greater than or equal to 1 micron, greater than or equal to 2 microns, greater than or equal to 3 microns, greater than or equal to 5 microns, greater than or equal to 10 microns, greater than or equal to 25 microns, greater than or equal to 50 microns, greater than or equal to 75 microns, greater than or equal to 100 microns, greater than or equal to 200 microns, greater than or equal to 300 microns, greater than or equal to 500 microns, or greater than or equal to 750 microns. In some cases, the average pore size of the porous medium is less than or equal to 1 millimeter, less than or equal to 750 microns, less than or equal to 500 microns, less than or equal to 300 microns, less than or equal to 200 microns, less than or equal to 100 microns, less than or equal to 75 microns, less than or equal to 50 microns, less than or equal to 25 microns, less than or equal to 10 microns, less than or equal to 5 microns, less than or equal to 3 microns, less than or equal to 2 microns, or less than or equal to 1 micron. Combinations of the foregoing ranges are possible (e.g., greater than or equal to 0.5 microns and less than or equal to 1 millimeter). Other ranges are also possible.

According to some embodiments, the collector may be configured to condense and/or solidify volatilized species from the electrolytic cell. In some cases, this may occur by the collector having a relatively low spatially averaged temperature compared to the spatially average temperature within the electrolytic cell, which may allow any volatilized species to condense and/or solidify in the collector, for example, on a porous medium. For instance, in some embodiments, the spatially averaged temperature within the collector may be less than or equal to 500 degrees C., less than or equal to 400 degrees C., less than or equal to 300 degrees C., less than or equal to 200 degrees C., or less than or equal to 100 degrees C. In some embodiments, the spatially averaged temperature within the collector may be greater than or equal to 50 degrees C., greater than or equal to 100 degrees C., greater than or equal to 200 degrees C., greater than or equal to 300 degrees C., or greater than or equal to 400 degrees C. Combinations of the foregoing ranges are possible (greater than or equal to 50 degrees C. and less than or equal to 500 degrees C.). Other ranges are also possible.

The relatively low spatially averaged temperatures within the collector may be achieved by having the collector in thermal communication with a heat exchanger, in some embodiments. The heat exchanger may contain a working fluid, e.g., water, which may facilitate heat transfer away from the collector, thereby lowering the spatially averaged temperature within the collector. Other systems and methods for cooling the collector are also possible, as this disclosure is not so limited. For example, in some embodiments, the collector may be cooled ambiently, for example, by being in direct thermal communication with ambient atmosphere.

According to some embodiments, species that condense and/or solidify in the collector may have any of a variety of sizes. For example, in some cases, particulates of the condensed and/or solidified species may have an average maximum cross-sectional dimension of less than or equal to 5 millimeters, less than or equal to 2 millimeters, less than or equal to 1 millimeter, less than or equal to 500 microns, less than or equal to 200 microns, less than or equal to 100 microns, or less than or equal to 50 microns. In some embodiments, particulates of the material may have an average maximum cross-sectional dimension of greater than or equal to 10 microns, greater than or equal to 50 microns, greater than or equal to 100 microns, greater than or equal to 200 microns, greater than or equal to 500 microns, greater than or equal to 1 millimeter, or greater than or equal to 2 millimeters. Combinations of the foregoing ranges are possible (e.g., greater than or equal to 10 microns in less than or equal to 1 millimeter). Other ranges are also possible.

In some embodiments, as described elsewhere herein, material (e.g., condensed and/or solidified species) collected within the collector may be reused and/or recycled within the electrolytic cell. In some such cases, reusing and/or recycling material from the collector (e.g., and/or scrubber) may facilitate longer operational times due to the addition of material for the electrolysis. Additionally, in accordance with some embodiments, using a collector as described herein may prolong the lifetime and/or extend the amount of time for which an electrolytic cell may be operated continuously due to the collection of such volatilized species. For example, using a collector as described herein may limit the amount of volatilized species (e.g., volatilized molten salts) from the electrolytic cell that is transported to the scrubber and/or that may reach the tubing of the scrubber, which may avoid clogging of such tubing and/or contamination of the scrubber and thereby extend the operation time of the electrolytic cell without need to clean and/or disassemble the cell.

According to some embodiments, the electrolytic cells described herein may be operated continuously for greater than or equal to 1 hour, greater than or equal to 2 hours, greater than or equal to 3 hours, greater than or equal to 4 hours, greater than or equal to 5 hours, greater than or equal to 6 hours, greater than or equal to 7 hours, greater than or equal to 8 hours, greater than or equal to 9 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 22 hours, greater than or equal to 24 hours, greater than or equal to 36 hours, greater than or equal to 48 hours, greater than or equal to 60 hours, greater than or equal to 72 hours, or greater than or equal to 84 hours. In some embodiments, the electrolytic cells described herein may be operated continuously for less than or equal to 96 hours, less than or equal to 84 hours, less than or equal to 72 hours, less than or equal to 60 hours, less than or equal to 48 hours, less than or equal to 36 hours, less than or equal to 24 hours, less than or equal to 22 hours, less than or equal to 20 hours, less than or equal to 18 hours, less than or equal to 16 hours, less than or equal to 14 hours, less than or equal to 12 hours, less than or equal to 10 hours, less than or equal to 9 hours, less than or equal to 8 hours, less than or equal to 7 hours, less than or equal to 6 hours, less than or equal to 5 hours, less than or equal to 4 hours, or less than or equal to 3 hours. Combinations of the foregoing ranges are possible (e.g., greater than or equal to 6 hours and less than or equal to 10 hours). Other ranges are also possible.

In certain embodiments, the system comprises a gas scrubber fluidically connected to the collector, the gas scrubber configured to at least partially remove a gas from an effluent stream of the cell. In some embodiments, the gas scrubber is fluidically connected to the collector by a sparger facing the interior of the gas scrubber. A sparger may be utilized to form bubbles having a sufficiently small diameter (e.g., at least 50 microns, at least 75 microns, at least 100 microns and/or less than or equal to 10000 microns, less than or equal to 1000 microns, and/or less than or equal to 500 microns, or any combination thereof (e.g., 50 to 10000 microns, 75 to 1000 microns, 100 to 500 microns, etc.)) to enhance mass transport within the gas scrubber. In some embodiments, the gas scrubber is directly fluidically connected to the cell (e.g., without an intervening cell or collector) by an outlet from the gas scrubber and an inlet to the cell. In certain embodiments, the gas scrubber comprises a divider configured to separate scrubbing agent excess from precipitate formed from incoming gas. In certain embodiments, the gas scrubber comprises one or more (e.g., at least two, at least three, at least four, or more) cleaning ports configured for retrieval of solid formed from reaction of gas and scrubbing agent. This solid may be retrieved by, e.g., shovels, dredging, a helical drive (e.g., an Archimedes screw), or the like. Cleaning port(s) may be utilized in this way for scrubber maintenance. The scrubbing agent may be, in accordance with certain embodiments, any source of reactant that is configured to react with a gas of interest, e.g., $CO_2$, and form a solid. For example, a caustic scrubber or basic scrubber may be used to capture $CO_2$. In some embodiments, a $CO_2$ scrubber may be put inline which comprises multiple chambers attached in series of a solution containing one of $Ca(OH)_2$, NaOH, $Mg(OH)_2$, LiOH, or other soluble alkali metal and/or alkaline earth metal containing compounds (e.g., $NaNO_3$, CsI, $CaCl_2$), SrBr).

In some embodiments, scrubbing $CO_2$ from any carbon and oxygen reactions within the cell takes place by reacting with alkaline earth metal to make insoluble salts.

In some embodiments, scrubbing halide (e.g., $I_2$, $Cl_2$, $Br_2$, $F_2$) from molten salt off gassing within the cell takes place by reacting with alkali metal and alkaline earth metals to make insoluble salts.

The system may comprise a pump configured to create a pressure drop resulting in the transport of gas into the cell. The pump may be, e.g., a positive pressure pump or a vacuum pump. The pump may be configured to remove effluent gas from the gas scrubber. To accomplish flow of matter through the system, a pressure gradient may be established by, e.g., over-pressurizing a gas feed entering the cell configured for molten salt electrolysis, and/or pulling slight suction on an outlet of the gas scrubber. The pressure differential may be, e.g., at least 1 inch of water. In some embodiments, the pressure differential is less than or equal to 1 atm.

In certain embodiments, the gas scrubber is a first gas scrubber configured to remove a first gas from the effluent stream of the cell, and the system further comprises a second gas scrubber fluidically connected to the first gas scrubber, wherein the second gas scrubber is configured to at least partially remove the first gas and/or a second gas from the effluent stream of the cell. In certain embodiments, the second gas scrubber comprises a divider configured to separate scrubbing agent excess from precipitate formed from incoming gas.

The system may comprise a solution in the gas scrubber, the solution comprising a scrubbing agent.

The system may comprise a thermal oxidizer fluidically connected to and between the cell and the gas scrubber. In some embodiments, the thermal oxidizer is fluidically connected to and between the collector and the gas scrubber. In some embodiments, the gas scrubber is fluidically connected to the thermal oxidizer by a sparger facing the interior of the gas scrubber. The thermal oxidizer may be configured to break down the materials entering from the molten salt electrolysis into gases amenable to scrubbing.

Any suitable number of gas scrubbers may be used in series and/or in parallel with one another (e.g., at least 1, at least 2, at least 3, or more gas scrubbers). In one example, the system comprises a first gas scrubber configured for scrubbing at least one gaseous halogen (e.g., fluorine, chlorine, etc.), and a second gas scrubber fluidically connected with the first gas scrubber and configured for scrubbing carbon dioxide. In some embodiments, a first gas scrubber may contain a first scrubbing agent chemically different from a second scrubbing agent in a second gas scrubber of the system. In some embodiments where two or more gas scrubbers are used in parallel, a first portion of the effluent gas from the collector may flow to and through a first gas scrubber, and a second portion of the effluent gas from the collector may flow to and through a second gas scrubber. In another embodiment where two or more gas scrubbers are used in parallel, a gas scrubbing method may be operated using a first gas scrubber while a second gas scrubber is cleaned (e.g., by draining to retrieve the solid product of gas and scrubbing agent).

In some embodiments, various (e.g., all) mechanical elements of this system comprise (e.g., consist of) stainless steel (e.g., 304, 316, or some comparable alloy). Valves and other instrumentation may have Teflon based seals or all stainless-steel construction (e.g., 304, 316, or some comparable alloy). Caustic scrubber components may comprise (e.g., consist of) PVC, CPVC, Fiberglass or corrosion resistant alloy (e.g., Inconel®, Hastelloy® or comparable material). Thermal oxidizers may comprise (e.g., consist of) stainless steel (e.g., typically type 321 or comparable material).

Parts, over time, may experience corrosion (e.g., from the corrosive effluent). Accordingly, in certain embodiments, the parts are designed for long lifetimes. In some embodiments, the system is designed to be sealed, to avoid exposure of the internal components of the system to water and/or air.

As noted above, certain aspects are related to methods. The methods may carry out recovery of gaseous materials (e.g., volatilized molten salt, inert gases) from molten salt electrolysis.

In certain embodiments, the method comprises, using a pressure gradient, transporting a gas comprising molten salt vapor from an electrolytic cell to and through a collector such that at least a portion of the molten salt vapor forms a solid within the collector. In some such embodiments, the collector comprises a porous medium and the at least a portion of the molten salt vapor forms the solid on the porous medium.

In certain embodiments, the method comprises, using a pressure gradient, transporting some or all of the gas from the collector through a gas scrubber such that a first portion of the gas reacts with a scrubbing agent to form a solid within the gas scrubber and a second portion of the gas is transported out of the gas scrubber. In some embodiments, the method involves introducing scrubbing agent into the gas scrubber before gas is introduced to the gas scrubber (e.g., through a sparger). In some embodiments, the gas scrubber is a first gas scrubber, and the method further comprises, using the pressure gradient, transporting some or all of the second portion of the gas from the first gas scrubber to a second gas scrubber. In some embodiments, the method further comprises transporting some or all of the second portion of the gas back to the cell (e.g., recycle stream 440 of FIG. 1F). This recycle may happen after any one or more of the scrubber stages. See, e.g., recycle stream 540 of FIG. 1G. In some embodiments, the effluent gas from the gas scrubber may be recycled if enough of the composition (e.g., at least 50 vol %, at least 75 vol %, at least 85 vol % and/or less than or equal to 100 vol %, or any combination thereof (e.g., 50 vol % to 100 vol %, 75 vol % to 100 vol %, 85 vol % to 100 vol %)) of the effluent gas is inert. Inert gases utilized in systems described herein include but are not limited to noble gases (e.g., argon), nitrogen, $CO_2$, $SO_2$, and the like. Generally, the inert gas will have limited reactivity with the molten salt.

In certain embodiments, the method comprises conducting electrolysis in the cell using the molten salt as an electrolyte.

In some embodiments, the method further comprises, before transporting some or all of the gas from the collector through the gas scrubber, transporting the some or all of the gas from the collector through a thermal oxidizer to oxidize at least one component of the gas from the collector.

In some embodiments, the method further comprises, before transporting the some or all of the gas from the cell to the gas scrubber, transporting the some or all of the gas from the cell through a thermal oxidizer to oxidize at least one component of the gas from the cell.

An illustrative system 100 configured for the recovery of gaseous substances from molten salt electrolysis is shown in FIG. 1A. The system 100 of FIG. 1A comprises a cell 102 configured for molten salt electrolysis; a collector 104 fluidically connected to cell 102, collector 104 configured to collect volatilized molten salt from cell 102; and a gas scrubber 108 fluidically connected to collector 104, gas scrubber 108 configured to at least partially remove a gas from an effluent stream of cell 102. System 100 may further comprise a pump configured to create a pressure drop resulting in the transport of gas (e.g., inert gas) into the cell. See, e.g., pump 442 in FIG. 1I, pump 742 in FIG. 1L. The pump may be configured to remove effluent gas from the gas scrubber. See, e.g., pump 342 in FIG. 1H, pump 542 in FIG. 1J, pump 642 in FIG. 1K.

Figure 1B:
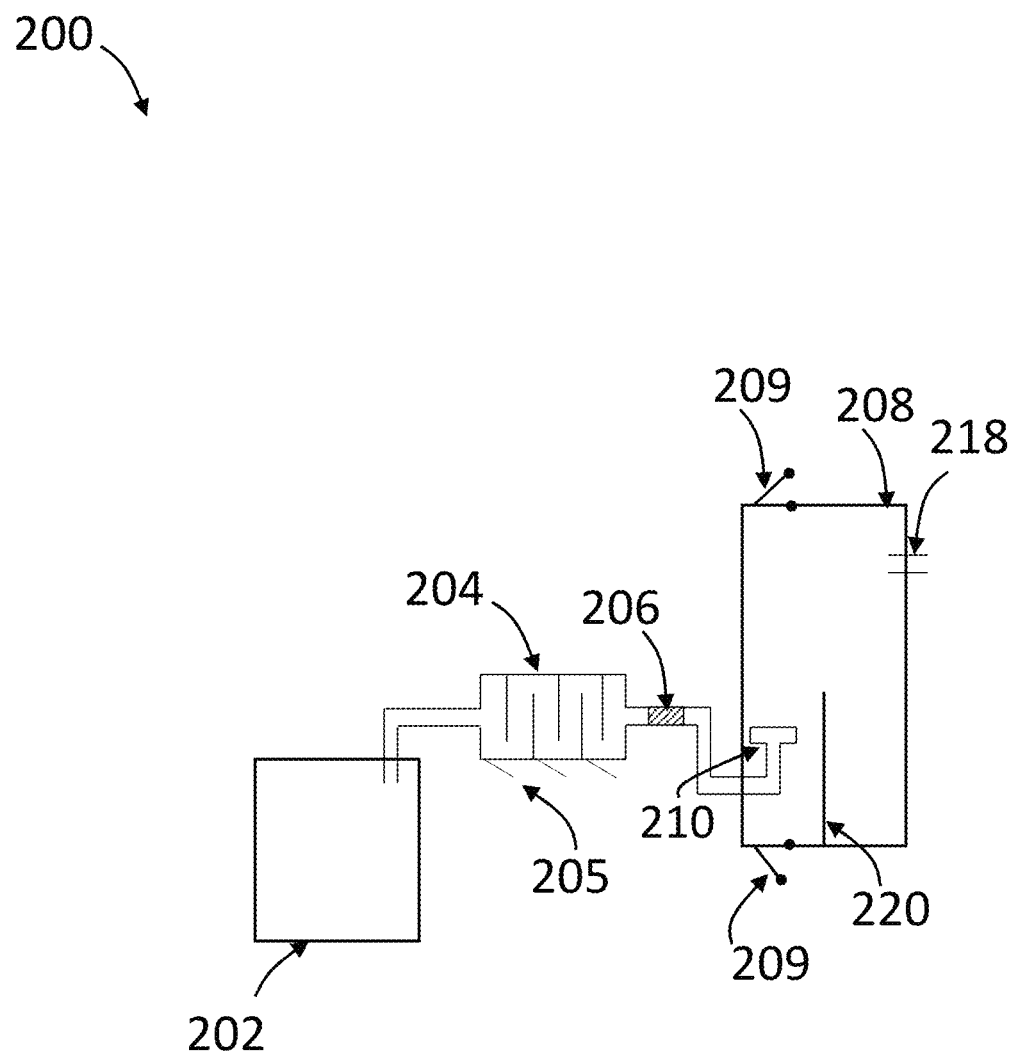

An illustrative system 200 configured for the recovery of gaseous substances from molten salt electrolysis is shown in FIG. 1B. The system 200 of FIG. 1B comprises a cell 202 configured for molten salt electrolysis; a collector 204 fluidically connected to cell 202, collector 204 configured to collect volatilized molten salt from cell 202; and a gas scrubber 208 fluidically connected to collector 204, gas scrubber 208 configured to at least partially remove a gas from an effluent stream of cell 202. Gas scrubber 208 comprises a divider 220 configured to separate scrubbing agent excess from precipitate formed from incoming gas. System 200 further comprises a thermal oxidizer 206 fluidically connected to and between cell 202 and gas scrubber 208. Collector 204 comprises doors 205 configured for recovering solid material from collector 204. Gas scrubber 208 comprises two cleaning ports 209 configured for retrieval of solid formed from reaction of gas and scrubbing agent. Gas scrubber 208 is fluidically connected to thermal oxidizer 206 by a sparger 210 facing the interior of gas scrubber 208.

Figure 1C:
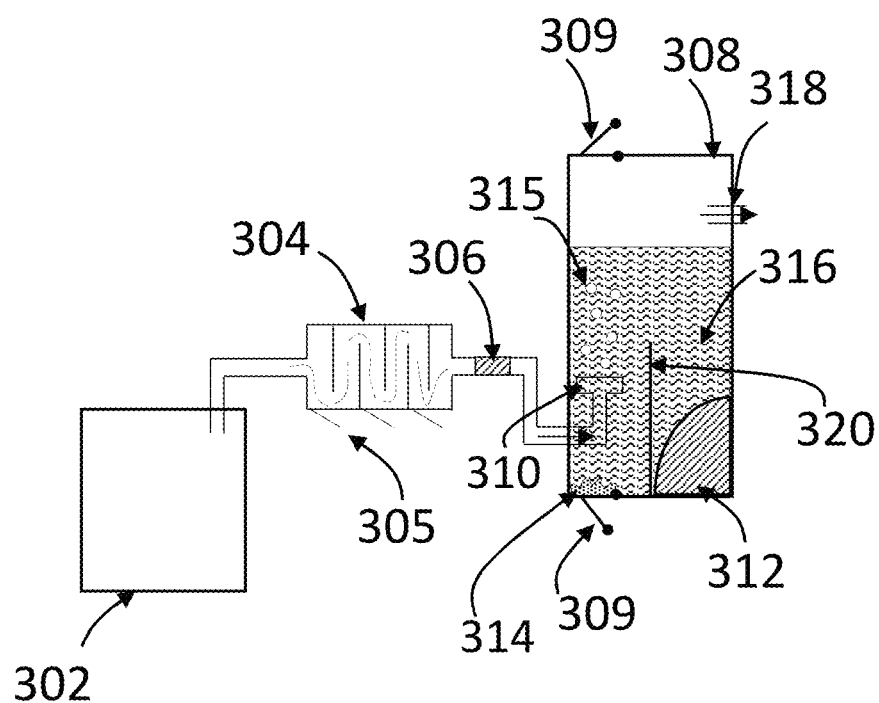

An illustrative system 300 configured for the recovery of gaseous substances from molten salt electrolysis is shown in FIG. 1C. System 300 of FIG. 1C comprises a cell 302 configured for molten salt electrolysis; a collector 304 fluidically connected to cell 302, collector 304 configured to collect volatilized molten salt from cell 302; and a gas scrubber 308 fluidically connected to collector 304, gas scrubber 308 configured to at least partially remove a gas from an effluent stream of cell 302. Gas scrubber 308 comprises a divider 320 configured to separate scrubbing agent excess from precipitate formed from incoming gas. System 300 further comprises a thermal oxidizer 306 fluidically connected to and between cell 302 and gas scrubber 308. Collector 304 comprises doors 305 configured for recovering solid material from collector 304. Gas scrubber 308 comprises two cleaning ports 309 configured for retrieval of solid formed from reaction of gas and scrubbing agent. Gas scrubber 308 is fluidically connected to thermal oxidizer 306 by a sparger 310 facing the interior of gas scrubber 308. System 300 may further comprise a pump (not shown) configured to create a pressure drop resulting in the transport of gas into the cell. The pump may be configured to remove effluent gas from the gas scrubber. The flow of gas through the system 300 is indicated by arrows. Scrubber 308 contains a solution 316 comprising a scrubbing agent, the excess of which is in a scrubbing agent excess precipitate 312. Gas from cell 302 arrives in scrubber 308 through sparger 310 in the form of bubbles 315. A first portion of the gas reacts with the scrubbing agent to form a solid 314 within the gas scrubber and a second portion of the gas is transported out of the gas scrubber through outlet 318. In some embodiments, the effluent gas exiting 318 is redirected into cell 302. See, e.g., recycle stream 540 of FIG. 1G.

Figure 1D:
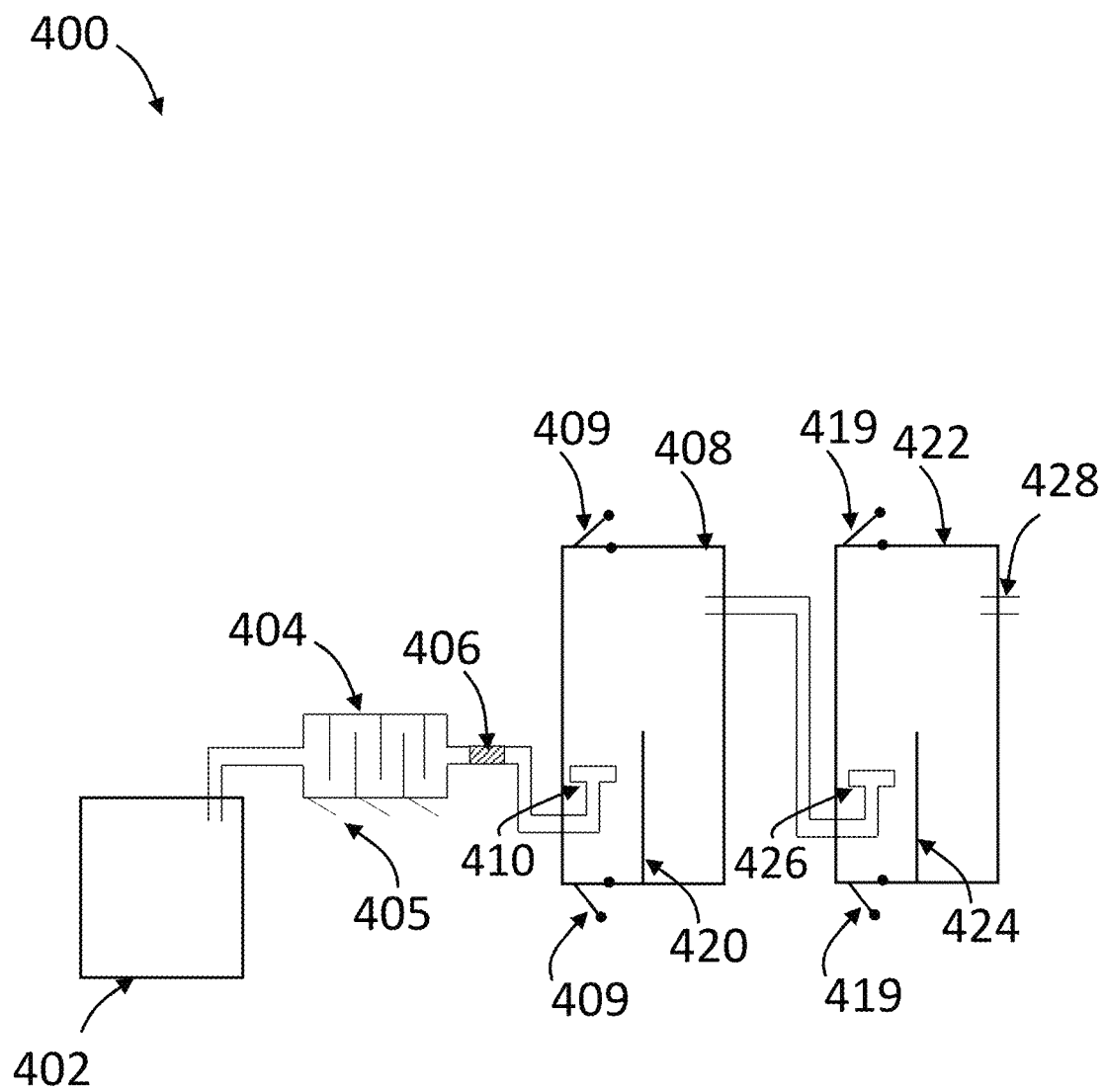

An illustrative system 400 configured for the recovery of gaseous substances from molten salt electrolysis is shown in FIG. 1D. The system 400 of FIG. 1D comprises a cell 402 configured for molten salt electrolysis; a collector 404 fluidically connected to cell 402, collector 404 configured to collect volatilized molten salt from cell 402; a first gas scrubber 408 fluidically connected to collector 404, gas scrubber 408 configured to at least partially remove a first gas from an effluent stream of cell 402; a second gas scrubber 422 fluidically connected to first gas scrubber 408, wherein second gas scrubber 422 is configured to at least partially remove the first gas and/or a second gas from the effluent stream of cell 402. Gas scrubbers 408 and 422 comprise dividers 420 and 424 respectively, configured to separate scrubbing agent excess from precipitate formed from incoming gas. System 400 further comprises a thermal oxidizer 406 fluidically connected to and between cell 402 and gas scrubber 408. Collector 404 comprises doors 405 configured for recovering solid material from collector 404. Gas scrubbers 408 and 422 each comprise two cleaning ports 409 and 419 respectively, configured for retrieval of solid formed from reaction of gas and scrubbing agent. First gas scrubber 408 is fluidically connected to thermal oxidizer 406 by a sparger 410 facing the interior of gas scrubber 408. First gas scrubber 408 is fluidically connected to thermal oxidizer 406 by a sparger 410 facing the interior of gas scrubber 408. Second gas scrubber 422 is fluidically connected to first gas scrubber 408 by a sparger 426 facing the interior of second gas scrubber 422.

Figure 1E:
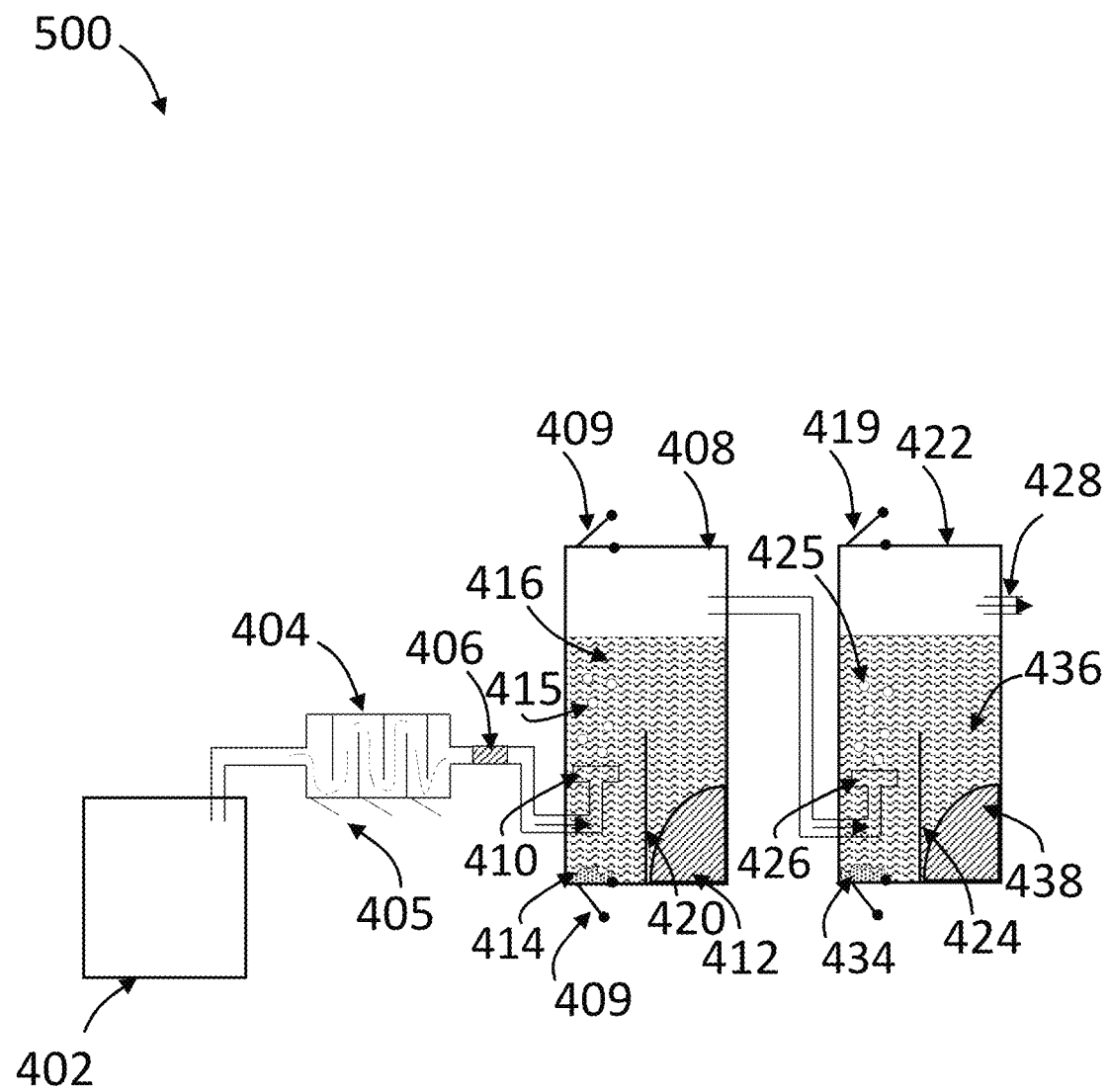
Figure 1F:
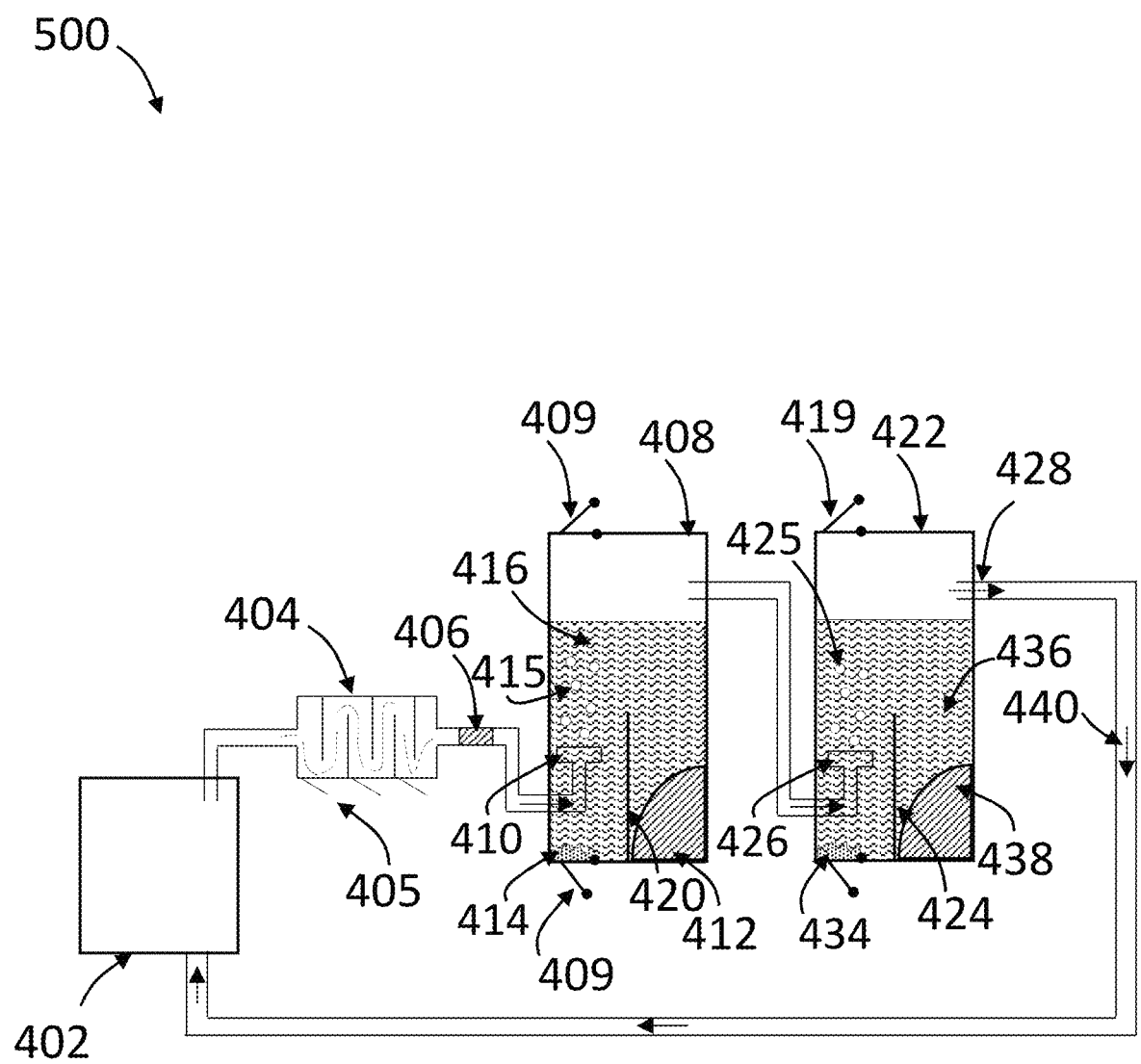
Figure 1G:
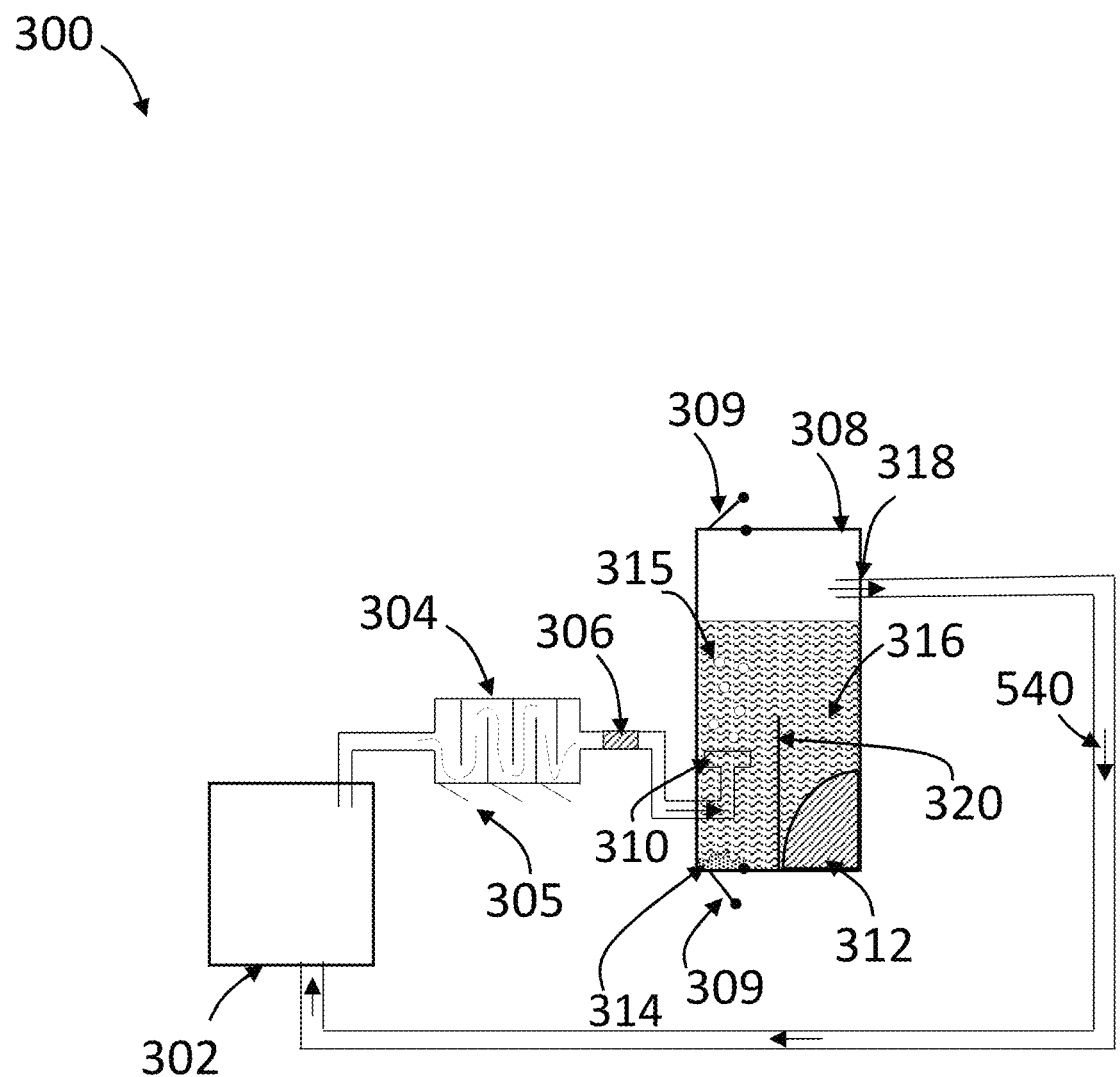
Figure 1H:
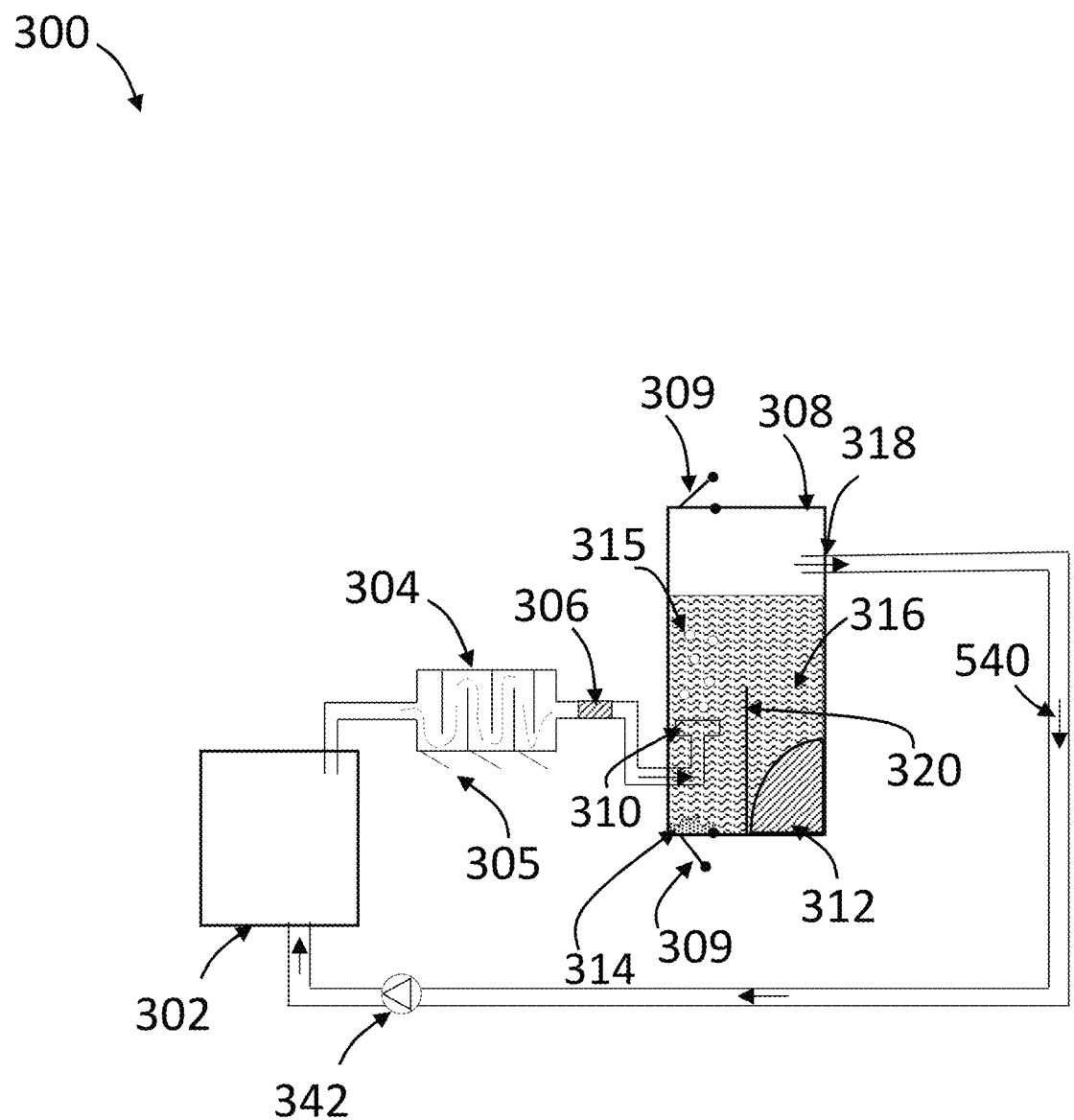
Figure 1I:
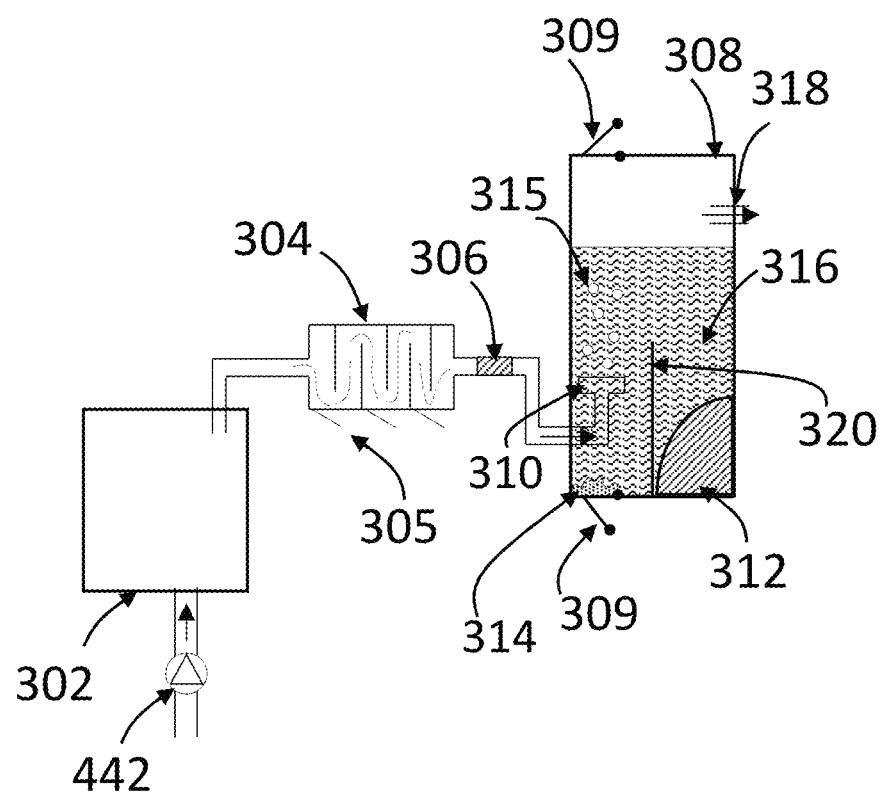
Figure 1J:
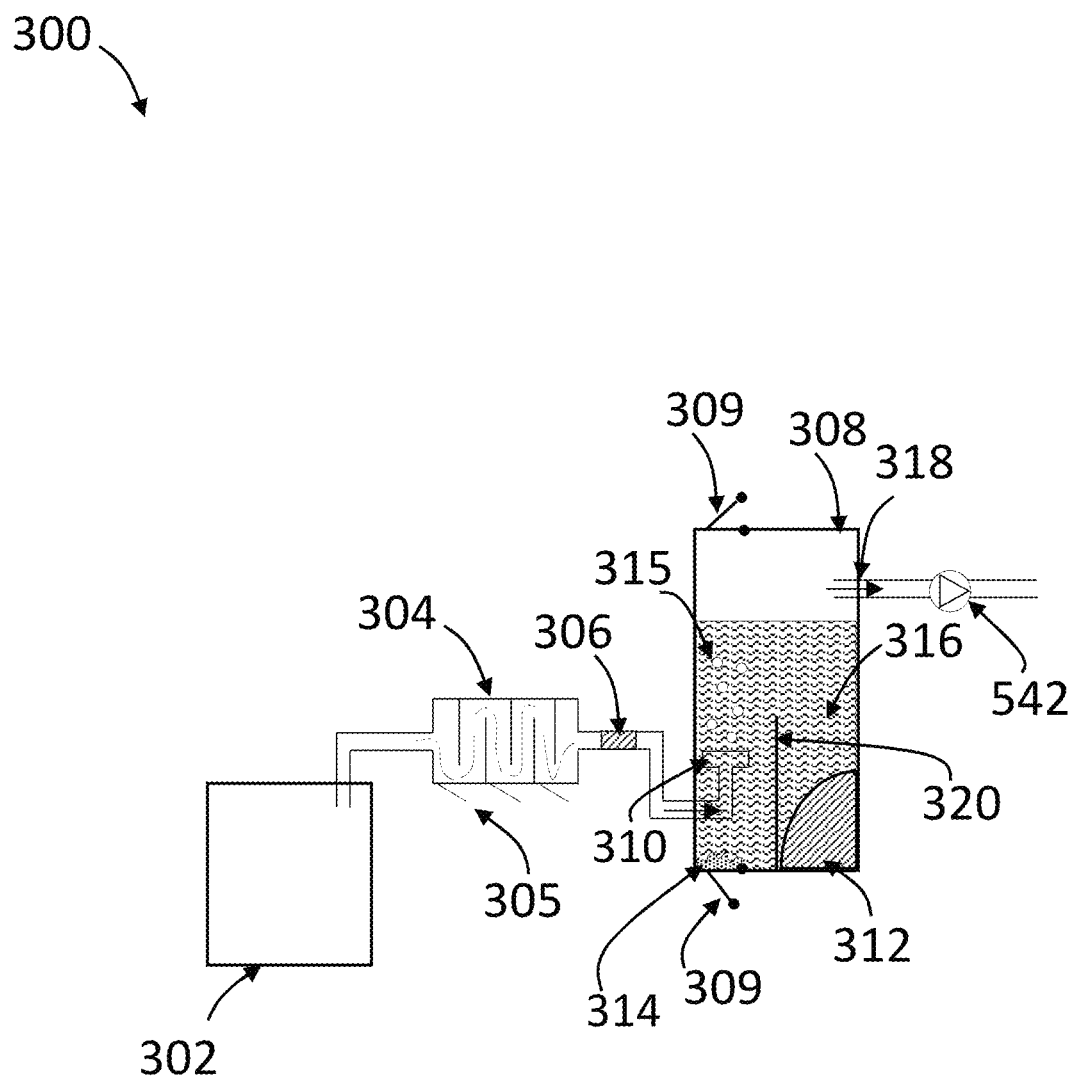
Figure 1K:
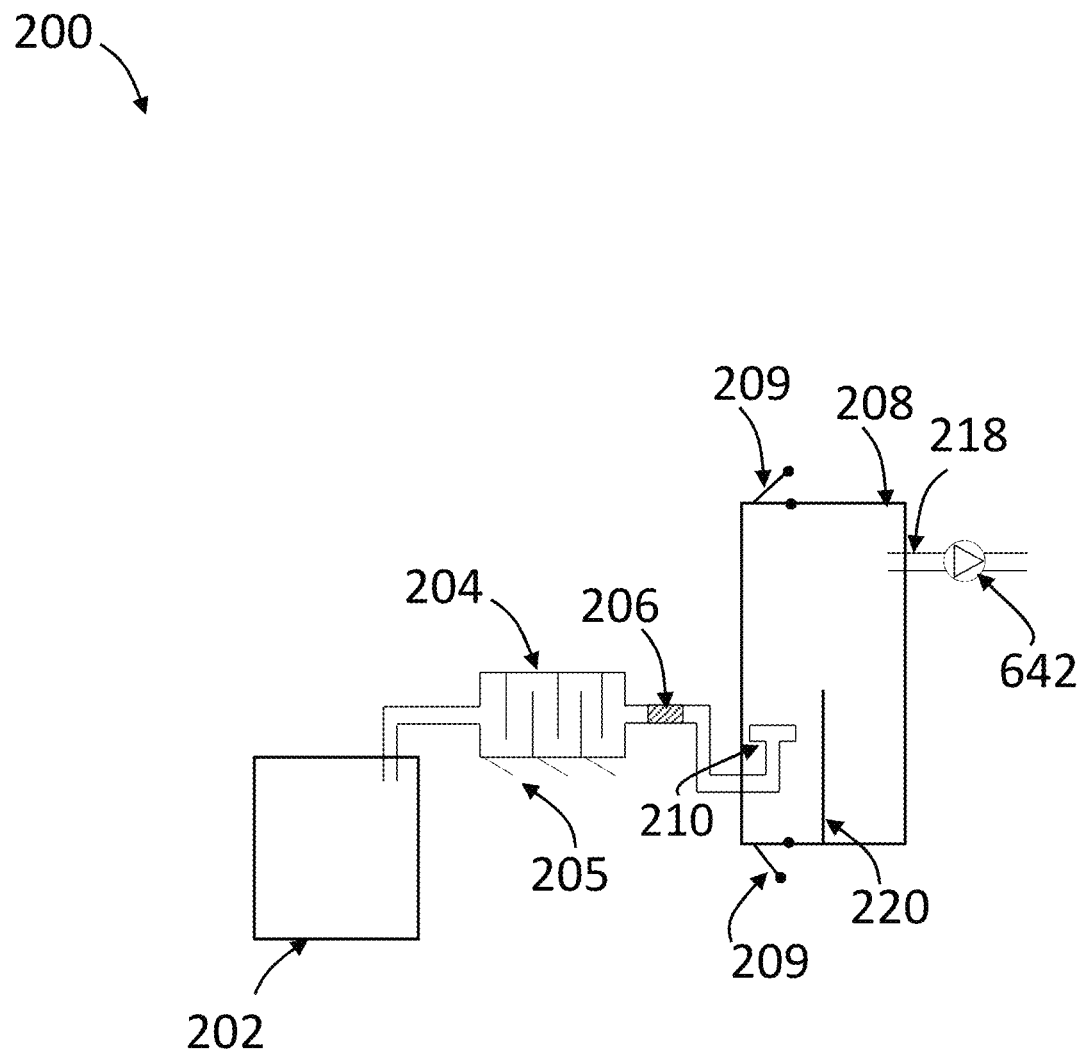
Figure 1L:
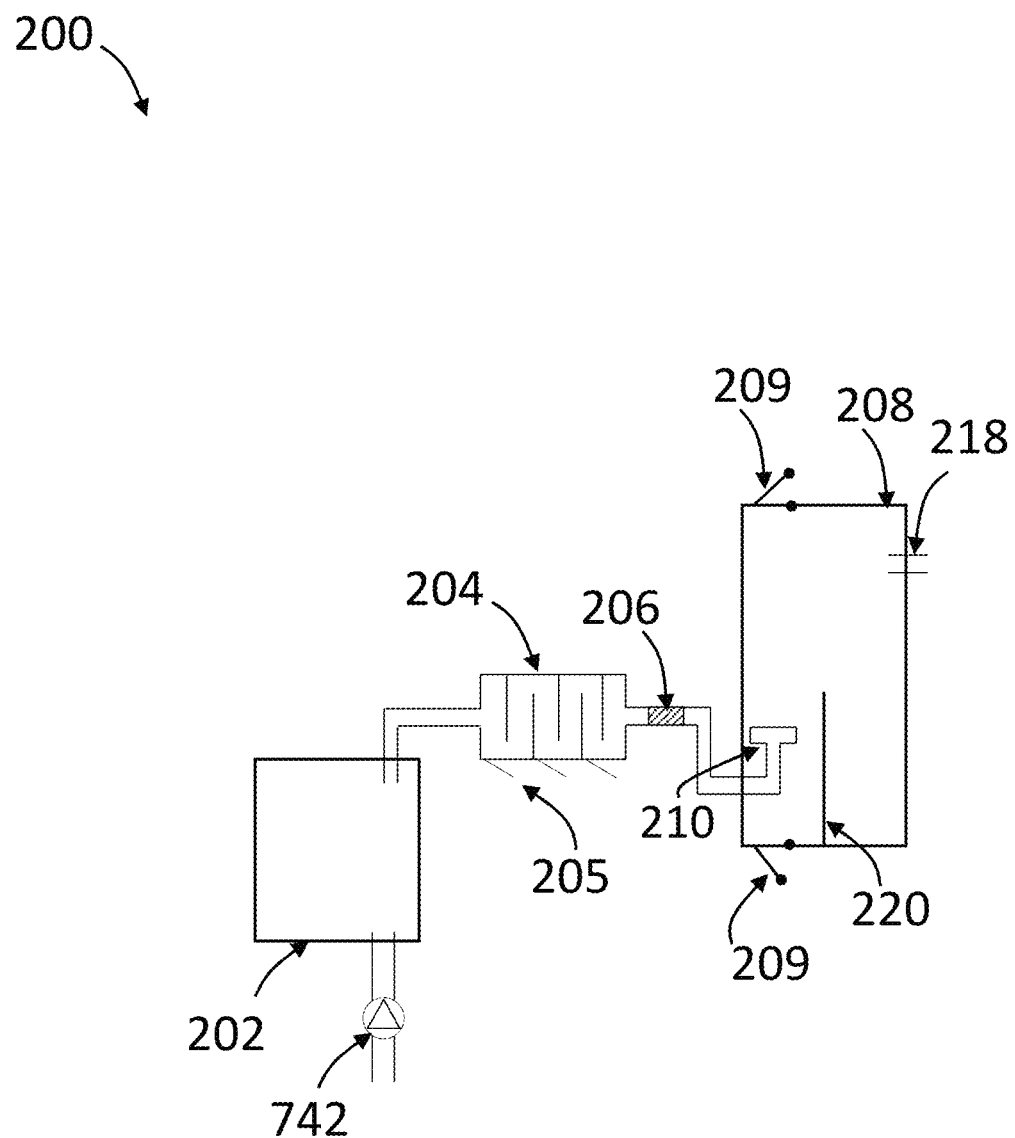

An illustrative system 500 configured for the recovery of gaseous substances from molten salt electrolysis is shown in FIG. 1E. The system 500 of FIG. 1E comprises a cell 402 configured for molten salt electrolysis; a collector 404 fluidically connected to cell 402, collector 404 configured to collect volatilized molten salt from cell 402; a first gas scrubber 408 fluidically connected to collector 404, gas scrubber 408 configured to at least partially remove a first gas from an effluent stream of cell 402; a second gas scrubber 422 fluidically connected to first gas scrubber 408, wherein second gas scrubber 422 is configured to at least partially remove the first gas and/or a second gas from the effluent stream of cell 402. Gas scrubbers 408 and 422 comprise dividers 420 and 424 respectively, configured to separate scrubbing agent excess from precipitate formed from incoming gas. System 400 further comprises a thermal oxidizer 406 fluidically connected to and between cell 402 and gas scrubber 408. Collector 404 comprises doors 405 configured for recovering solid material from collector 404. Gas scrubbers 408 and 422 each comprise two cleaning ports 409 and 419 respectively, configured for retrieval of solid formed from reaction of gas and scrubbing agent. First gas scrubber 408 is fluidically connected to thermal oxidizer 406 by a sparger 410 facing the interior of gas scrubber 408. First gas scrubber 408 is fluidically connected to thermal oxidizer 406 by a sparger 410 facing the interior of gas scrubber 408. Second gas scrubber 422 is fluidically connected to first gas scrubber 408 by a sparger 426 facing the interior of second gas scrubber 422. System 400 may further comprise a pump (not shown) configured to create a pressure drop resulting in the transport of gas into cell 402. The pump may be configured to remove effluent gas from the gas scrubber. The flow of gas through the system 500 is indicated by arrows. Scrubbers 408 and 422 each contain a solution 416 and 436 respectively, each solution comprising a scrubbing agent. The scrubbing agent may be present as a solid, such as solids 412 and 438, respectively. In some embodiments, the solution is at or near (e.g., within 5% of) saturation, and as scrubbing agent in solution reacts with gas(es), solid scrubbing agent is dissolved into solution, replenishing the solubilized scrubbing agent. The scrubbing agent in scrubbers 408 and 422 may be the same or different. Gas from cell 402 arrives in first gas scrubber 408 through sparger 410 in the form of bubbles (e.g., 415). A first portion of the gas reacts with the first scrubbing agent in first gas scrubber 408 to form a solid 414 within first gas scrubber 408 and a second portion of the gas is transported out of the first gas scrubber 408 and some or all of the second portion is transported to second gas scrubber 422. Gas from first gas scrubber 408 arrives in second gas scrubber 422 through sparger 426 in the form of bubbles (e.g., 425). A first portion of the second portion of the gas reacts with the second scrubbing agent in the second gas scrubber 422 to form a solid 434 within second gas scrubber 422 and a second portion of the second portion of the gas is transported out of the second gas scrubber 422 through outlet 428. In some embodiments, the effluent gas exiting 428 is redirected into cell 402, e.g., in recycle stream 440 of FIG. 1F.

In some embodiments, a method comprises, using a pressure gradient: transporting a gas comprising molten salt vapor from an electrolytic cell 302 to and through a collector 304 such that at least a portion of the molten salt vapor forms a solid within collector 304; and transporting some or all of the gas from collector 304 through a gas scrubber 308 such that a first portion of the gas reacts with a scrubbing agent to form a solid 314 within gas scrubber 308 and a second portion of the gas is transported out of gas scrubber 308 through outlet 318.

In some embodiments, a method comprises, using a pressure gradient: transporting a gas comprising molten salt vapor from an electrolytic cell 402 to and through a collector 404 such that at least a portion of the molten salt vapor forms a solid within collector 404; transporting some or all of the gas from collector 404 through a first gas scrubber 408 such that a first portion of the gas reacts with a scrubbing agent to form a solid 414 within gas scrubber 408; and transporting some or all of a second portion of the gas from first gas scrubber 408 to a second gas scrubber 422. In some cases, collector 404 may have doors configured to facilitate the recovery of the solid material that forms within the collector 404. In accordance with some embodiments, the method further comprises collecting solid material from the collector 404. In some such cases, the solid material may be recycled and/or reused within the electrolytic cell by introducing the solid material into the electrolytic cell via an inlet.

In general, in use, the electrolytic cell is capable of driving a non-spontaneous redox reaction. The electrolytic cell may comprise, in accordance with certain embodiments, an anode, a cathode, and an electrolyte. The electrolyte may comprise, in certain embodiments, a molten salt. Typically, operation of the electrolytic cell proceeds as follows. A source of electrical energy may be connected to the anode and the cathode, and electrical energy from the source may be used to drive a non-spontaneous redox reaction between the anode and the cathode. The source of electrical energy (e.g., an AC power source, a battery, or any other suitable source) may be used to generate a potential difference between the anode and the cathode that forces electrons to flow from the anode to the cathode, which drives the non-spontaneous redox reaction. At the anode, an oxidation half-reaction generally occurs, whereas at the cathode, a reduction half-reaction generally occurs. The electrolyte is generally used to facilitate the transport of ions between the anode and the cathode, which balances the charges within the cell as electrons are transported between the anode and the cathode.

A variety of types of materials may be used as the anode, the cathode, and the electrolyte of the electrolytic cell, and the selection of these materials generally depends on the type of redox reaction that is being driven by the electrolytic cell. In some embodiments, the selection of these materials may depend on the operating temperature of the electrolytic cell.

Examples of materials from which the anode and/or the cathode can be made include, but are not limited to, carbon (e.g., graphitic carbon such as graphene, graphite, carbon nanotubes, and the like); metal (e.g., copper, silver, zinc, tantalum, molybdenum, and the like); and conducting ceramics and/or cermets (e.g., yttria-stabilized zirconia (YSZ), lanthanum strontium manganite (LSM), Gd-doped ceria, and borides such as $TiB_2$ and other diborides).

The electrolyte may comprise, according to certain embodiments, any of a variety of suitable molten salts. In some embodiments, the molten salt(s) comprises one or more halogen salts. A "halogen salt" is any salt that contains a halogen. For the purposes of the present disclosure, the "halogen" elements are fluorine (F), chlorine (Cl), bromine (Br), iodine (I), astatine (At), and tennessine (Ts). Non-limiting examples of halogen salts include NaCl, KCl, NaF, KF, $MgF_2$, and $CaBr_2$. When halogen salt is employed, the solid salt that is heated may include a single halogen salt or a combination of multiple halogen salts. In accordance with certain embodiments, it may be advantageous to use particular combinations of halogen salts to achieve desired bath characteristics, enhanced processing efficiencies, and other advantages. In some embodiments, the molten salt comprises an alkali metal and/or an alkaline earth metal. The term "alkali metal" is used herein to refer to the following six chemical elements of Group 1 of the periodic table: lithium (Li), sodium (Na), potassium (K), rubidium (Rb), cesium (Cs), and francium (Fr). The term "alkaline earth metal" is used herein to refer to the six chemical elements in Group 2 of the periodic table: beryllium (Be), magnesium (Mg), calcium (Ca), strontium (Sr), barium (Ba), and radium (Ra).

The electrolytic cell may comprise, in accordance with certain embodiments, a container (e.g., in which at least a portion (or all) of the anode, the cathode, and the electrolyte are contained). The electrolytic cell container may have any of a variety of suitable sizes. In some embodiments, the electrolytic cell container has an interior volume of at least 500 $cm^3$; at least 1000 $cm^3$; at least 10,000 $cm^3$; at least 100,000 $cm^3$; at least 1 $m^3$; or at least 10 $m^3$ (and/or up to 100 $m^3$; up to 1000 $m^3$; up to 10,000 $m^3$; or greater).

In some embodiments, the collector comprises a container. In some embodiments, the collector container may contain the porous medium, as described elsewhere herein. The collector container may have any of a variety of suitable sizes. In some embodiments, the scrubber container has an interior volume of at least 500 $cm^3$; at least 1000 $cm^3$; at least 10,000 $cm^3$; at least 100,000 $cm^3$; at least 1 $m^3$; or at least 10 $m^3$ (and/or up to 100 $m^3$; up to 1000 $m^3$; up to 10,000 $m^3$; or greater).

In some embodiments, the scrubber(s) comprises a container. The scrubber container may have any of a variety of suitable sizes. In some embodiments, the scrubber container has an interior volume of at least 500 $cm^3$; at least 1000 $cm^3$; at least 10,000 $cm^3$; at least 100,000 $cm^3$; at least 1 $m^3$; or at least 10 $m^3$ (and/or up to 100 $m^3$; up to 1000 $m^3$; up to 10,000 $m^3$; or greater).

In certain embodiments, one or more components of the system (e.g., the electrolytic cell, the collector, the scrubber(s), the thermal oxidizer, the conduits, and/or any other components of the system, optional or otherwise) may be thermally insulated.

Figure 2:
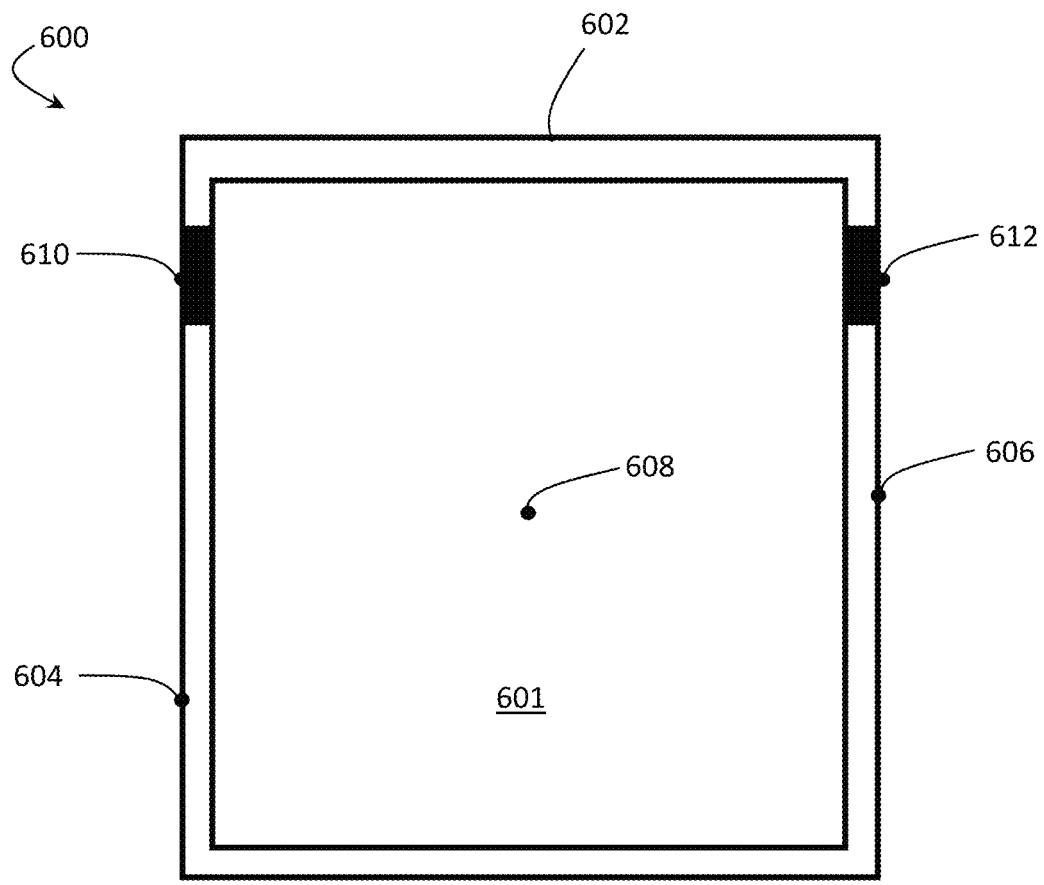
FIG. 2 is a cross-sectional schematic illustration of a container, according to certain embodiments.

The use of thermally insulated components may be particularly useful when high temperature operation (which may be useful when processing or otherwise handling molten salts and/or molten reaction products) is desired. In some embodiments, the interior of the container is substantially surrounded (e.g., at least 50% surrounded, at least 70% surrounded, at least 80% surrounded, at least 90% surrounded, at least 98% surrounded, or 100% surrounded) by thermally insulating solid material. The thermally insulating solid material may have, for example, a thermal conductivity of less than or equal to 10 W/mK at 25° C., less than or equal to 1 W/mK at 25° C., or less than or equal to 0.1 W/mK at 25° C. To determine whether the interior of a container is "at least 50% surrounded" by thermally insulating solid material, one would: (1) locate the geometric center of the interior of the container; (2) for each location on the outer boundary of the container, establish a straight line from the geometric center of the interior of the container to that location on the outer boundary of the container; and (3) calculate the percentage of the straight lines that pass through thermally insulating solid material. If the result of Step 3 is at least 50%, then the interior of the container would be said to be at least 50% surrounded by thermally insulating solid material. A similar calculation may be performed to determine whether a container is surrounded by thermally insulating solid material to any other degree (e.g., at least 70% surrounded by, at least 80% surrounded by, etc.). One example of this calculation may be described in relation to FIG. 2. In FIG. 2, container 600 is made of both thermally insulating material (shown in white in the figure) and thermally conducting material (shown in black in the figure). Interior 601 of container 600 in FIG. 2 is at least 50% surrounded by thermally insulating solid material because 50% or more of the locations on the outer boundary 602 of container 600 (including locations 604 and 606) have thermally insulating solid material positioned between those locations and geometric center 608 of container 600. (In contrast, locations 610 and 612 do not have thermally insulating solid material positioned between them and geometric center 608 of container 600.)

Examples of thermally insulating solid materials that may be used to make at least a portion of (e.g., at least 50 vol % of, at least 75 vol % of, at least 90 vol % of, at least 95 vol % of, at least 99 vol % of, or more of) a container include, but are not limited to, metal oxides, metal nitrides, metalloid oxides, and metalloid nitrides. Specific examples of thermally insulating solid materials that may be used to make at least a portion of (e.g., at least 50 vol % of, at least 75 vol % of, at least 90 vol % of, at least 95 vol % of, at least 99 vol % of, or more of) a container include, but are not limited to, concrete, glasses, ceramics, and/or cermets.

As noted above, in some embodiments, the electrolytic cell may be operated at a relatively high temperature. For example, in some embodiments, the spatially averaged temperature within the electrolytic cell is at least 30° C., at least 50° C., at least 100° C., at least 200° C., at least 400° C., at least 600° C., at least 800° C., at least 1000° C., at least 1500° C., at least 2000° C., at least 3000° C., and/or less than or equal to 4000° C., or less than or equal to 3500° C. Combinations of these ranges are also possible.

As used herein, two elements are in "fluidic communication" with each other (or, equivalently, in fluid communication with each other) when fluid may be transported from one of the elements to the other of the elements without otherwise altering the configurations of the elements or a configuration of an element between them (such as a valve). Two conduits connected by an open valve (thus allowing for the flow of fluid between the two conduits) are considered to be in fluidic communication with each other. In contrast, two conduits separated by a closed valve (thus preventing the flow of fluid between the conduits) are not considered to be in fluidic communication with each other.

As used herein, two elements are "fluidically connected" to each other when they are connected such that, under at least one configuration of the elements and any intervening elements, the two elements are in fluidic communication with each other. Two conduits connected by a valve that permits flow between the two conduits in at least one configuration of the valve would be said to be fluidically connected to each other. To further illustrate, two conduits that are connected by a valve that permits flow between the conduits in a first valve configuration but not a second valve configuration are considered to be fluidically connected to each other both when the valve is in the first configuration and when the valve is in the second configuration. In contrast, two fluidic conduits that are not connected to each other (e.g., by a valve, another conduit, or another component) in a way that would permit fluid to be transported between them under any configuration would not be said to be fluidically connected to each other. Elements that are in fluidic communication with each other are always fluidically connected to each other, but not all elements that are fluidically connected to each other are necessarily in fluidic communication with each other.

Figure 3:
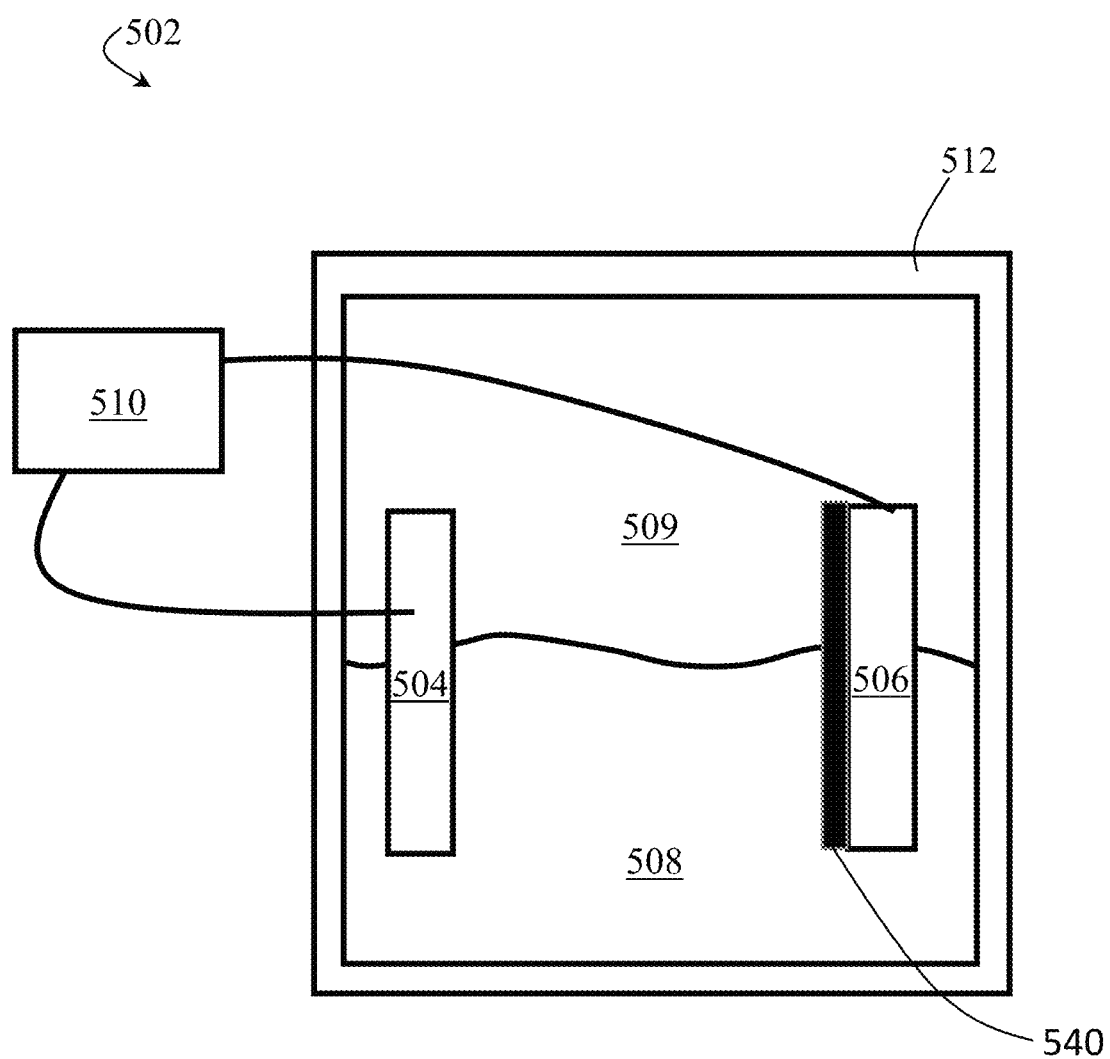
FIG. 3 is a cross-sectional schematic illustration of an electrolytic cell, according to certain embodiments.

As noted above, in certain embodiments, the system comprises an electrolytic cell. One example of such a cell is shown in FIG. 3. In FIG. 3, the electrolytic cell 502 comprises container 512, molten salt 508 as an electrolyte, anode 504, and cathode 506. Typically, operation of the electrolytic cell proceeds as follows. A source of electrical energy (e.g., source 510 in FIG. 3) can be connected to the anode and the cathode, and electrical energy from the source can be used to drive a nonspontaneous redox reaction between the anode and the cathode. The source of electrical energy (e.g., an AC power source, a DC power source, a battery, or any other suitable source) can be used to generate a potential difference between the anode and the cathode that forces electrons to flow from the anode to the cathode, which drives the nonspontaneous redox reaction. At the anode, an oxidation half reaction generally occurs, whereas at the cathode, a reduction half-reaction generally occurs. The electrolyte is generally used to facilitate the transport of ions between the anode and the cathode, which balances the charges within the cell as electrons are transported between the anode and the cathode, for example, by external circuitry connecting the anode and the cathode. In some embodiments, during an electrolytic reaction, molten metal may be formed on the surface of the cathode and/or anode. For example, in FIG. 3, molten metal 540 is illustrated in cathode 506. In some embodiments, the headspace within the electrolytic cell comprises inert gas(es). For example, in FIG. 3, headspace 509 can comprise one or more inert gases. During operation, the headspace of the electrolytic cell may further comprise compounds that are volatilized from the molten salt and/or electrogenerated from at least one of the electrodes. For instance, as described elsewhere herein, a halogen gas may be electrogenerated at the anode during operation, in some cases. In some embodiments, at least a portion of the molten salt, in which the electrolysis occurs, may volatilize.

Any of a variety of metals may be formed in (e.g., at an electrode of) the electrolytic cell. Forming a metal may comprise reducing a cationic metal species to its zero valent form (e.g., on and/or at a surface of an electrode), in some embodiments. Examples of molten metals that can be contained within the electrolytic cell include, but are not limited to, zinc, cadmium, calcium, aluminum, iron, vanadium, tin, silicon, lanthanides, and/or lanthanide ferroalloys. The "lanthanides," as used herein, are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). In some embodiments, rare earth metals (e.g., cerium (Ce), lanthanum (La), praseodymium (Pr), neodymium (Nd), promethium (Pm), europium (Eu), gadolinium (Gd), samarium (Sm), dysprosium (Dy), yttrium (Y), terbium (Tb), holmium (Ho), erbium (Er), thulium (Tm), ytterbium (Yb), yttrium (Y), scandium (Sc), and/or lutetium (Lu)) can be formed in the electrolytic cell. In some cases, transition metals may be formed in the electrolytic cell. The "transition metals," as used herein, are scandium (Sc), titanium (Ti), vanadium (V), chromium (Cr), manganese (Mn), iron (Fe), cobalt (Co), nickel (Ni), copper (Cu), zinc (Zn), yttrium (Y) zirconium (Zr), niobium (Nb), molybdenum (Mo), technetium (Tc), rubidium (Ru), palladium (Pd), silver (Ag), cadmium (Cd), lutetium (Lu), hafnium (Hf), tantalum (Ta), tungsten (W), rhenium (Re), osmium (Os), iridium (Ir), platinum (Pt), gold (Au), and mercury (Hg).

As noted above, in certain embodiments, the system can be one in which molten salts are used. In some embodiments, the molten salt contains a halogen. In some embodiments, the molten salt contains multiple halogen species, for example, as a mixed halide molten salt. In some such embodiments, the anionic species present in the molten salt comprise more than one halide, e.g., fluoride and chloride. Other combinations of halides are also possible. Non-limiting examples of molten salts that can be used include molten sodium chloride, molten sodium fluoride, molten potassium chloride, molten potassium fluoride, molten zinc chloride, molten copper chloride, molten iron chloride, molten copper chloride, molten aluminum chloride, or mixtures of any two or more of these or other chlorides. In some embodiments, the molten salt comprises a molten hydroxide salt, such as a molten alkali metal hydroxide and/or a molten alkaline earth metal hydroxide. In some embodiments, the molten salt comprises molten sodium hydroxide. In some embodiments, the molten salt(s) comprises an alkali metal halide (e.g., sodium chloride, potassium chloride), an alkaline metal halide, a rare earth metal halide, a transition metal halide (e.g., ferric chloride), and/or an oxygen-containing salt (e.g., oxide salts containing non-bridging oxygen, oxyhalides such as oxychloride and/or oxyfluoride, rare earth metal oxides). In some embodiments, metal from the molten salt can be collected at an electrode of the electrolytic cell. In some cases, the molten salt may comprise a rare earth metal halide, oxide, and/or oxyhalide. In some cases, the molten salt may comprise a transition metal halide, oxide, and/or oxyhalide. In some cases, the molten salt may comprise an alkali metal halide, oxide, and/or oxyhalide. In some cases, the molten salt may comprise an alkaline earth metal halide, oxide, and/or oxyhalide. According to some embodiments, the cation (e.g., a cationic rare earth metal, transition metal, alkali metal, and/or alkaline earth metal) may be reduced to form the corresponding metal from the molten salt in the electrolytic cell.

As used herein, "at least partially" means some or all. In some embodiments, at least partially refers to at least 10 wt % (e.g., at least 20 wt %, at least 30 wt %, at least 40 wt %, at least 50 wt %, at least 60 wt %, at least 70 wt %, at least 80 wt %, or more) and/or up to 90 wt % (e.g., up to 95 wt %, up to 99 wt %, or up to 100%).

The following examples are intended to illustrate certain embodiments of the present invention, but do not exemplify the full scope of the invention.

Example 1

A cell was operated to make iron metal from iron chloride. Initial scrubber configurations found that just a water-based scrubber led to low operation time (less than 2 hours) before servicing was required. To improve expected servicing time to four hours, a second container was put in line between the cell and the scrubber that housed steel wool as a solids collector. Upon testing, the unit unexpectedly demonstrated the ability to operate for more than eight hours continuously. Furthermore, the recovered solidified iron chloride could be, and was, reintroduced into the cell as feed.

Example 2

An electrolytic system produced chlorine gas from a mixed chloride-fluoride molten salt in a stainless-steel chamber. The exhaust was plumbed into a sodium hydroxide solution. After continuous electrolysis of more than 8 hours, the exhaust gas tube entering the sodium hydroxide solution was found to have been clogged with a brown substance that was found to be iron oxide. Subsequent electrolysis tests were conducted with an additional glass canister containing 0000 plain steel wool mesh, approximately 15 cm tall (e.g., a collector), inline after the stainless-steel chamber before the sodium hydroxide solution. During electrolysis in the presence of the glass canister containing the plain steel wool mesh, runs were conducted for over 100 hours without any production of iron oxides in the sodium hydroxide solution. Instead, corrosion of iron chloride species was found to occur on the plain steel wool mesh. Preventing and/or minimizing the formation of precipitates in the tubing leading to the sodium hydroxide solution facilitates continuous electrolysis for longer times without needing to disassemble and clean the system.

Example 3

An electrolytic system that produced carbon dioxide gas from an oxyfluoride molten salt in a stainless-steel chamber was assembled. The exhaust from the stainless-steel chamber was plumbed into a sodium hydroxide solution. After continuous electrolysis of more than 40 hours in the system, traces of powder were observable in the bottom of the sodium hydroxide solution vessel, indicating that the evaporation of the fluoride component of the molten salt was occurring and the fluoride component was being trapped in the sodium hydroxide solution. Subsequent electrolysis tests were conducted with an additional glass canister filled with 0000 plain steel wool mesh, approximately 15 cm tall, inline before the sodium hydroxide solution. Subsequent electrolysis runs were conducted for over 100 hours without any production of residual powders in the sodium hydroxide solution. Instead, traces of powder became visible on the plain steel wool mesh, indicating that the steel wool mesh was trapping the species before the sodium hydroxide solution.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
   a cell configured for molten salt electrolysis;
   a collector fluidically connected to the cell, the collector configured to collect volatilized molten salt from the cell; and
   a gas scrubber fluidically connected to the collector, the gas scrubber configured to at least partially remove a gas from an effluent stream of the cell,
   wherein the system is configured to replenish the cell with the salt collected in the collector.

2. The system of claim 1, further comprising a conduit in fluidic communication with the cell, the conduit configured to introduce salt collected in the collector into the cell.

3. The system of claim 1, wherein the gas scrubber comprises a divider configured to separate scrubbing agent excess from precipitate formed from incoming gas.

4. The system of claim 1, further comprising a pump configured to create a pressure drop resulting in the transport of gas into the cell.

5. The system of claim 1, wherein the gas scrubber is a first gas scrubber configured to remove a first gas from the effluent stream of the cell, and the system further comprises a second gas scrubber fluidically connected to the first gas scrubber, wherein the second gas scrubber is configured to at least partially remove the first gas and/or a second gas from an effluent stream of the first gas scrubber.

6. The system of claim 1, further comprising a solution in the gas scrubber, the solution comprising a scrubbing agent.

7. The system of claim 1, further comprising a thermal oxidizer fluidically connected to and between the cell and the gas scrubber.

8. The system of claim 1, wherein the collector comprises a porous medium.

9. The system of claim 1, wherein the collector comprises a door configured for recovering salt collected in the collector.

10. The system of claim 5, wherein the second gas scrubber comprises a divider configured to separate scrubbing agent excess from precipitate formed from incoming gas.

11. The system of claim 8, wherein the porous medium has an average pore size of greater than or equal to 0.5 microns and less than or equal to 1 millimeter as measured by porosimetry.

12. The system of claim 8, wherein the porous medium comprises an electronically conductive material.

13. The system of claim 8, wherein the porous medium comprises a metal.

14. The system of claim 8, wherein the porous medium comprises stainless steel.

15. The system of claim 8, wherein the porous medium comprises steel wool.

16. The system of claim 7, wherein the thermal oxidizer is configured to oxidize at least one component of the gas.

17. The system of claim 6, wherein the gas scrubber comprises a cleaning port configured for retrieval of solid formed from reaction of the gas and the scrubbing agent.

18. The system of claim 5, wherein the second gas scrubber comprises an outlet in fluidic communication with the cell.

19. The system of claim 1, wherein the cell comprises molten salt.

20. The system of claim 19, wherein the molten salt comprises a rare earth metal halide, oxide, and/or oxyhalide.

21. The system of claim 1, further comprising a heat exchanger in thermal communication with the collector.

22. The system of claim 1, wherein the gas scrubber is fluidically connected to the collector by a sparger facing an interior of the gas scrubber.

* * * * *